United States Patent [19]

Kester et al.

[11] Patent Number: 5,314,707

[45] Date of Patent: * May 24, 1994

[54] POLYOL FATTY ACID POLYESTER COOKING MEDIUMS

[75] Inventors: Jeffrey J. Kester, West Chester; Joseph J. Elsen, Cincinnati; Thomas J. Wehmeier, Cincinnati; Jerry D. Young, Cincinnati, all of Ohio

[73] Assignee: The Procter & Gamble Company, Cincinnati, Ohio

[*] Notice: The portion of the term of this patent subsequent to Feb. 4, 2009 has been disclaimed.

[21] Appl. No.: 705,194

[22] Filed: May 24, 1991

[51] Int. Cl.$^5$ .............................. A23D 9/00
[52] U.S. Cl. ................................. 426/611; 426/612; 426/804; 426/438
[58] Field of Search ............... 426/438, 611, 612, 804, 426/601, 607, 606

[56] References Cited

U.S. PATENT DOCUMENTS

| | | |
|---|---|---|
| 2,831,854 | 4/1958 | Tucker et al. . |
| 3,355,302 | 11/1967 | Purves et al. . |
| 3,429,714 | 2/1969 | Nelson ................ 426/611 |
| 3,490,918 | 1/1970 | Egan ................... 426/611 |
| 3,600,186 | 8/1971 | Mattson et al. . |
| 3,867,556 | 2/1975 | Darragh et al. . |
| 3,963,699 | 6/1976 | Rizzi et al. . |
| 4,005,195 | 1/1977 | Jandacek . |
| 4,005,196 | 1/1977 | Jandacek et al. . |
| 4,034,083 | 7/1977 | Mattson . |
| 4,517,360 | 5/1985 | Volpenhein . |
| 4,518,772 | 5/1985 | Volpenhein . |
| 4,797,300 | 1/1989 | Jandacek et al. . |
| 4,880,657 | 11/1989 | Guffey ................ 426/611 |
| 4,940,601 | 7/1990 | Orphanos ............ 426/611 |
| 4,952,687 | 8/1990 | Bodor ................. 426/611 |
| 4,960,600 | 10/1990 | Kester et al. . |
| 4,960,602 | 10/1990 | Talkington .......... 426/611 |
| 5,017,398 | 5/1991 | Jandacek ............. 426/611 |
| 5,021,256 | 6/1991 | Guffey ................ 426/611 |
| 5,039,544 | 8/1991 | Lansbergen ......... 426/611 |
| 5,071,669 | 12/1991 | Seiden ................. 426/611 |
| 5,085,884 | 2/1992 | Young ................. 426/611 |

FOREIGN PATENT DOCUMENTS 0236288 9/1987 European Pat. Off. .
0384508 8/1990 European Pat. Off. .

OTHER PUBLICATIONS

Kester, Edible Films and Coatings: a Review, *Food Technology* 40 (12), pp. 47-59, Dec. 1986.
Jandacek & Webb, Physical Properties of Pure Sucrose Octaesters, *Chemistry and Physics of Lipids*, 22 (1978), 163-176.
Weiss, *Foods and Oils and Their Uses*, 157-160; 166-167; 181-183, 2d Ed. (1983).

*Primary Examiner*—Carolyn Paden
*Attorney, Agent, or Firm*—Tara M. Rosnell; J. M. Howell; E. W. Guttag

[57] ABSTRACT

A reduced calorie fat composition comprising: (a) from about 50% to about 100% of polyol fatty acid polyesters consisting of a combination of liquid and solid polyol fatty acid polyesters, and from 0% to about 50% triglycerides. The liquid polyol fatty acid polyester having at least 50% saturated fatty acid radicals with not more than 14 carbon atoms, provides faster moisture transport than prior polyol fatty acid polyester fat compositions. As a result, foods cooked in the present compositions have good texture, crispness, mouthfeel, color, and taste with reduced calories.

43 Claims, No Drawings

POLYOL FATTY ACID POLYESTER COOKING MEDIUMS

TECHNICAL

The field of the invention is frying and cooking oils made from polyol fatty acid polyesters, in particular polyols esterified with short chain fatty acids.

BACKGROUND ART

An essential part of any cooking process (e.g., frying or baking) is transport of moisture away from the food product at the same time that heat is being transferred into that food product. Transporting moisture out of the food is a critical factor governing texture (e.g. crispness), color (e.g. effect on browning reactions), internal starch structure (e.g. degree of gelatinization), and flavor generation during cooking. For example, frying foods such as french fries in oil blends with low moisture transport properties can lead to a non-crisp, limp textured cooked product which is considered unappealing to the consumer. Therefore, superior frying mediums have an optimum moisture transport rate that produces foods with good texture and taste.

Conventional cooking oils made from edible fats are known to produce fried foods which have desirable texture and flavor. These edible fats may comprise saturated and/or unsaturated triglycerides, as well as monoglycerides, diglycerides, or other emulsifiers. Although foods fried in these fats have desirable texture and taste, their ingestion at high levels is known to significantly contribute to obesity and health risks such as coronary heart disease. Therefore, a need exists for cooking oils which do not add calories and fats to the foods cooked in them.

Cooking oils comprising polyol fatty acid polyesters have been developed in order to reduce fat and calories of foods cooked in oils. For example, U.S. Pat. No. 3,600,186, Mattson et al., issued Aug. 17, 1971, discloses low calorie food compositions produced by replacing at least a portion of the fat content of a conventional food with a sugar fatty acid ester or sugar alcohol fatty acid ester. These esters have at least 4 fatty acid ester groups, with each fatty acid having from 8 to 22 carbon atoms. These sugar or sugar alcohol fatty acid esters which contain unsaturated fatty acid ester groups and/or a preponderance of short chain, i.e. less than $C_{14}$, fatty acid ester groups are generally liquid at room temperature. A plastic shortening is disclosed made with 50% sucrose octastearate. A deep fat frying oil is disclosed made from the erythritol tetraester of olive oil fatty acids (ETOFA). These compositions are found to reduce the fat and the calorie levels of the foods cooked in them. Pan frying and deep fat frying of various foods in ETOFA, such as potato pieces, eggs, beefsteaks, breaded shrimp and breaded codfish steaks, are disclosed therein.

U.S. Pat. No. 4,797,300 of Jandacek et al., issued Jan. 10, 1989, discloses a shortening composition comprising from about 75% to about 90% of an edible oil having a complete melting point below 37° C. and from about 10% to about 25% of a solid polyester of sucrose wherein the ester groups consist essentially of a mixture of short chain saturated fatty acid radicals containing from $C_2$ to $C_{10}$ and long chain saturated fatty acid radicals containing from $C_{20}$ to $C_{24}$, in a molar ratio of short chain to long chain fatty acid radicals of from about 3:5 to about 5:3, and wherein the degree of esterification is from about 7 to about 8. The shortening is said to be useful in frying oils, and for cooking a variety of foods having reduced fat and calories. Example 1 discloses a sucrose polyester containing four caprylic acids and four behenic acids per sucrose molecule.

U.S. Pat. No. 4,005,195 of Jandacek, issued Jan. 25, 1977, discloses liquid polyol fatty acid polyesters and anti-anal leakage agents used for the treatment of hypercholesterolemia. In Example IV, a cooking fat is disclosed made with 50% liquid sucrose polyester and 50% cocoa butter. The sucrose polyester comprises about half the heptaester and about half the octaester (or an average 7.5 ester) of sucrose and oleic acid.

U.S. Pat. No. 4,005,196 of Jandacek et al., issued Jan. 25, 1977, discloses a combination of liquid polyol polyesters, anti-anal leakage agents, and fat-soluble vitamins. Example VI discloses a cooking fat made with 70% sucrose octaoleate and 30% sucrose octastearate.

U.S. Pat. No. 4,034,083 of Mattson, issued Jul. 5, 1977, discloses polyol fatty acid polyesters fortified with fat-soluble vitamins and used in food or pharmaceutical compositions for treating and/or preventing hypercholesterolemia. Cooking oils and plastic shortenings are specifically mentioned. In Example V, Mattson discloses a plastic shortening, containing 40% xylitol pentaoleate, which is suitable for use in frying and other types of cooking. Ingestion of foods cooked in said oil can reduce the body's serum cholesterol level.

European Patent Application 0,236,288 of Bernhardt, published Sep. 9, 1987, discloses sucrose polyesters esterified with $C_8$ to $C_{22}$ fatty acids. The preferred fatty acid composition is said to be 9–12% palmitic, 42–53% stearic, 19–39% oleic, 2–17% linoleic, 0–2% linolenic, 0–2% arachidic, 0–10% behenic, and 0–2% erucic. The polyesters are disclosed as being useful in making frying oils, and foods fried in oils such as potato chips, corn chips, and other fried farinaceous snack foods.

Jandacek et al., Physical Properties of Pure Octaesters, 22 Chemistry and Physics of Lipids, 163–176 (1978), discloses sucrose octaesters of the following fatty acids: caprylic, capric, lauric, myristic, palmitic, stearic, oleic, elaidic and linoleic. Polymorphism, heat of fusion, melting of binary systems, refractive index, viscosity, density, and interfacial tension of sucrose octaesters is disclosed. Particular uses for the sucrose octaesters, however, are not disclosed.

Kester et al., *Food Technology* 40 (12), pp. 47–59, December 1986, generally discusses edible coatings which retard moisture and gas transmission into and out of foods. Lipids, due to their relative low polarity, are said to block moisture transmission when applied in a thin layer to the surface of food products such as crackers. It is stated that paraffin and beeswax are greatly resistant to water transmission because of their molecular compositions; paraffin wax consists of a mixture of long-chain, saturated hydrocarbons, while beeswax comprises 71% hydrophobic, long-chain ester compounds, 15% long-chain hydrocarbons, and 8% long-chain fatty acids. Kester states that the effectiveness of a particular surfactant film in reducing moisture evaporation was influenced by the structure of the surfactant; the 16- and 18-carbon fatty alcohols, as well as glycerol monopalmitate and glycerol monostearate, were most effective. FIG. 2 shows a correlation between hydrocarbon chain length and inhibition of water evaporation for a single layer of monoglyceride and fatty alcohol surfactants; the lower the chain length (down to $C_{10}$), the less that evaporation was inhibited. U.S. Pat. No. 4,960,600, Kester et al., issued Oct. 2, 1990, discloses the use of polyol fatty acid esters for reducing the rate of moisture transmission into and out of foods. The polyol fatty acid esters have at least 4 fatty acid ester groups, wherein at least 90% of the fatty acids contain not less than 16 carbon atoms. Said compositions are used as thin coatings for foods such as cereals and starch-based snack foods.

A problem associated with use of liquid nondigestible oils, i.e., those having a melting point below body temperature (about 37° C.), is an undesired "passive oil loss effect", (hereinafter oil loss) which is manifested in leakage of the nondigested liquid oil through the gastrointestinal tract's anal sphincter. Regular ingestion of moderate to high levels of completely liquid forms of these polyol polyesters can produce this oil loss. Suitable oil loss control agents include higher melting fatty materials i.e. triglyceride hardstocks, solid sucrose polyesters, and mixtures thereof. These agents are disclosed in U.S. Pat. No. 4,005,195, Jandacek, issued Jan. 25, 1977; U.S. Pat. No. 4,797,300 to Jandacek et al, issued Jan. 10, 1989; and U.S. applications Ser. Nos. 514,800 to Young et al; 514,793, 514,794, and 514,903, all to Letton et al., and filed Apr. 26, 1990; all herein incorporated by reference.

It is therefore a further objective of this invention to provide reduced calorie cooking oils which have superior cooking properties, good oxidative stability, and passive oil loss control.

All parts, percentages and ratios used herein are by weight unless otherwise indicated.

SUMMARY OF THE INVENTION

The present invention relates to a reduced calorie fat composition comprising:

A) from about 50% to 100% polyol fatty acid polyesters comprising:
1) from about 70% to about 99% liquid polyol fatty acid polyester, wherein the polyols used to synthesize the liquid polyester contain at least 4 hydroxyl groups and the liquid polyol fatty acid polyester contains at least 4 fatty acid ester groups, with each fatty acid ester group having from about 2 to about 24 carbon atoms and wherein at least about 50% of the fatty acid ester groups are saturated fatty acid radicals and contain not more than 14 carbon atoms;
2) from about 1% to about 30% solid polyol fatty acid polyester having a complete melting point above about 37° C. wherein the polyols used to synthesize the solid polyester contains at least 4 hydroxyl groups and the solid polyol fatty acid polyester contains at least 4 fatty acid ester groups; and
B) from 0% to about 50% triglycerides.

Many of the frying mediums containing high levels of polyol polyesters, as disclosed in the aforementioned art, do not exhibit positive cooking characteristics as compared to triglyceride oils. This was initially thought to be due to the higher fluid viscosity of the polyol polyesters hindering the removal of moisture from the food during cooking, thereby imparting less desirable texture, crispness, mouthfeel, color, and flavor. It has been discovered that certain polyol polyester frying mediums, even with higher viscosities than triglycerides, can provide the attributes that characterize foods cooked in triglyceride oils. Although not intending to be limited by theory, it is thought that proper moisture transport through the polyol polyesters depends upon the relative degree of polarity of the polyester molecules as well as its viscosity; the greater the polarity of the polyol polyester, the greater the moisture transport rate.

The polarity of the polyol polyesters depends upon factors such as the degree of esterification with fatty acid radicals, and the character of said radicals. Fatty acid characteristics effecting polarity include chain length, the degree of saturation, and attached side chains. For example, shorter chain-length (i.e. $C_{14}$ or lower) fatty acid groups esterified onto the polyol backbone result in more polar molecules and a higher rate of moisture transmission than polyol polyesters esterified with less polar, longer chain-length (i.e. $C_{16}$ or higher) fatty acids. Therefore, a polyol polyester frying medium having a higher proportion of short chain-length fatty acids will fry foods better than polyol polyesters with a higher proportion of long chain-length fatty acids.

DETAILED DESCRIPTION OF THE INVENTION

The present invention is directed to compositions, especially cooking and frying oils. These reduced calorie fat compositions comprise:

(A) from about 50% to about 100% polyol fatty acid polyesters containing:
1) from about 70% to about 99% liquid polyol fatty acid polyester, wherein the polyols used to synthesize the liquid polyester contain at least 4 hydroxyl groups and the liquid polyol fatty acid polyester contains at least 4 fatty acid ester groups, with each fatty acid ester group having from about 2 to about 24 carbon atoms and wherein at least about 50% of the fatty acid ester groups are saturated fatty acid radicals and contain not more than 14 carbon atoms;
2) from about 1 to about 30% solid polyol fatty acid polyester having a complete melting point above about 37° C., wherein the polyols used to synthesize the solid polyester contain at least 4 hydroxyl groups and the polyol polyester contains at least 4 fatty acid ester groups; and
(B) from 0% to about 50% triglycerides.

These compositions have enhanced cooking performance compared to polyol polyester frying oils known in the art. Such oils have higher water vapor transport rates and impart desirable sensory attributes, and lowers calorie levels of foods cooked in them.

A. POLYOL POLYESTERS

The polyol fatty acid polyesters are found in the present invention from about 50% to about 100%, preferably from about 65% to about 100%, and most preferably from about 90% to about 100%. The polyol fatty acid polyesters are selected from the group consisting of mixtures of liquid and solid polyol fatty acid polyesters.

In the present invention, polyols which are used to synthesize the polyol fatty acid polyesters include compounds containing at least four hydroxyl groups. These compounds may be aliphatic or aromatic and include sugars, sugar alcohols, and other sugar derivatives (e.g. alkyl glycosides). Preferred polyols for use in the present invention are sugar and sugar alcohols. The term "sugar" is used herein in its conventional sense as generic to mono-, di-, and trisaccharides. The term "sugar alcohol" is also used in its conventional sense as generic to the reduction product of sugars wherein the aldehyde or ketone group has been reduced to an alcohol. The fatty acid polyester compounds are prepared by reacting a monosaccharide, disaccharide, trisaccharide, or sugar alcohol with fatty acids as discussed below. The preferred sugars and sugar alcohols are those which contain 4 to 8 (more preferably 6 to 8) hydroxyl groups.

Examples of suitable monosaccharides containing 4 hydroxyl groups are xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, and fructose. The sugar alcohol derived from glucose, i.e. sorbitol, contains 6 hydroxyl groups and is also suitable as the polyol moiety of the fatty acid ester compound. Examples of suitable disaccharides are maltose, lactose, and sucrose, all of which contain 8 hydroxyl groups. Examples of trisaccharides suitable for the present invention include raffinose and maltotriose which contain 11 hydroxyl groups. Disaccharides are preferred for use in the present invention. Most preferred is sucrose.

A characterizing feature of the polyol fatty acid polyesters useful in this invention is that they predominantly contain at least 4 fatty acid polyester groups. As disclose in U.S. Pat. No. 3,600,186, Mattson et al., issued Aug. 17, 1971 (incorporated herein by reference), sugar alcohol fatty acid polyester compounds that contain 4 or less fatty acid ester groups are digested in the intestinal tract much in the same manner as ordinary triglyceride fats, but sugar or sugar alcohol fatty acid polyester compounds that contain four or more fatty acid ester groups are substantially nondigestible and consequently not absorbable by the body.

Polyol fatty acid polyesters most suitable for use in the present invention are selected from the group consisting of sugar fatty acid polyesters, and sugar alcohol fatty acid polyesters.

Sucrose fatty acid polyesters are the preferred polyol fatty acid polyesters used in the present invention. The sucrose fatty acid esters are selected from the group consisting of octaesters, heptaesters and hexaesters, pentaesters, tetraesters, and mixtures thereof.

The polyol fatty acid polyesters suitable for use herein can be prepared by a variety of methods known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. Examples of these various methods for preparing sucrose fatty acid polyesters are described in U.S. Pat. Nos. 2,831,854, 3,600,186, 3,963,699, 4,517,360, and 4,518,772 (all herein incorporated by reference).

The fatty acids can be derived from suitable naturally occurring or synthetic fatty acids and can be saturated or unsaturated, including positional and geometric isomers (e.g., cis and trans isomers).

1. Liquid Polyol Fatty Acid Polyesters

The liquid polyol fatty acid polyesters are used in the polyol fatty acid polyester blends at levels from about 70% to about 99%, preferably from about 80% to about 99%, more preferably from about 88% to about 99%, and most preferably about 94% to about 99%. The term liquid indicates that the polyester is in a liquid state at body temperature, preferably at normal room temperatures.

The liquid polyol fatty acid polyesters of the present invention have at least four of its hydroxyl groups esterified with fatty acid radicals having from about 2 to about 24 carbon atoms wherein at least about 50% of the fatty acid radicals are saturated and contain not more than 14 carbon atoms. Better frying performance is achieved when at least about 50%, more preferably at least about 70%, and most preferably at least 90% of the fatty acid radicals contain not more than 12 carbon atoms. These short chain fatty acid radicals are selected from the group consisting of caproic, caprylic, capric, lauric, and mixtures thereof. Best frying performance is achieved when at least about 50%, more preferably at least about 70%, and most preferably at least about 90%, of the fatty acid radicals contain not more than 8 carbon atoms. Such fatty acid radicals are selected from the group consisting of caproic, caprylic, and mixtures thereof.

2. Solid Polyol Fatty Acid Polyesters

The solid polyol fatty acid polyesters are used in the polyol fatty acid polyester compositions at levels from about 1% to about 30%, preferably from about 1% to about 20%, more preferably from about 1% to about 12%, and most preferably about 1% to about 6%.

The solid polyol polyesters used in the present invention have a complete melting point above about 37° C., preferably above about 50° C. and most preferably above about 60° C. (Unless otherwise specified, all complete melting points reported herein are measured according to the method described in the analytical method section below.) These solid polyol polyesters, or hardstocks, have at least 4 fatty acid ester groups, wherein the ester groups consist essentially of $C_{16}$ or higher saturated fatty acid radicals. Such solid compositions are disclosed in U.S. Pat. Nos. 4,005,195; 4,005,196; 4,797,300; all to Jandacek et al.; herein incorporated by reference. These solids have the ability to bind with their crystal structure, high levels of digestible or non-digestible oils. These solids are particularly useful to bind non-digestible oils to prevent passive oil loss.

Preferred solid polyol polyesters used in the present invention have at least 4 fatty acid ester groups wherein the ester groups comprise a combination of (a) long chain, unsaturated fatty acid radicals, short chain saturated fatty acid radicals, or mixtures thereof; and (b) long chain saturated fatty acid radicals.

The long chain unsaturated fatty acid radicals of (a) are typically straight chain (i.e., normal) greater than $C_{12}$, preferably about $C_{12}$–$C_{26}$, more preferably about $C_{18}$–$C_{22}$, and most preferably $C_{18}$ fatty acid radicals. Due to their oxidative stability, the mono- and/or diunsaturated fatty acid radicals of $C_{18}$ are preferred. Examples of long chain unsaturated fatty acid radicals used in the solid polyol polyesters herein are lauroleate, myristoleate, palmitoleate, oleate, elaidate, erucate, linoleate, linolenate, arachidonate, eicosapentaenoate, and docosahexaenoate.

The short chain saturated fatty acid radicals of (a) are typically normal $C_2$–$C_{12}$, preferably $C_6$–$C_{12}$, and most preferably $C_8$–$C_{12}$ fatty acid radicals. Examples of these short chain saturated fatty acid radicals are acetate, caproate, caprylate, caprate, and laurate.

The long chain saturated fatty acid radicals are typically normal $C_{20}$ and higher, preferably $C_{20}$-$C_{26}$, and most preferably $C_{22}$ fatty acid radicals. The solid polyol fatty acid polyester contains at least about 15%, preferably at least about 30%, more preferably at least about 50%, and most preferably at least about 60% (by total weight of the fatty acid radicals in the solid polyol polyester) of these long chain saturated fatty acid polyesters. Examples of long chain saturated fatty acid radicals used herein are arachidate, behenate, lignocerate and cerotate. The preferred long chain saturated fatty acid radical is behenate.

The molar ratio of Group (a) fatty acid radicals to Group (b) fatty acid radicals in the solid polyol polyester molecule is from about 1:15 to about 2:1; preferably about 1:7 to about 5:3; more preferably about 1:7 to about 3:5. The average degree of esterification of these solid polyol fatty acid polyesters is such that at least 4 of the hydroxyl groups of the polyol are esterified. In the case of sucrose polyesters from about 7 to 8 of the hydroxyl groups of the polyol are preferably esterified. Typically, substantially all (e.g., at least about 85%, preferably at least about 95%) of the hydroxyl groups of the polyol are esterified.

Of course, the Group (a) fatty acid radicals can be used singularly or in mixtures in all proportions. Similarly, the long chain saturated radicals used in (b) can be a mixture of fatty acid radicals through out the range disclosed herein in all proportions to each other. Mixed fatty acid radicals from source oils which contain substantial amounts of the desired unsaturated or saturated acids can be used as the fatty acid radicals to prepare compounds of the invention. The mixed fatty acid radicals from the oils should contain at least about 30%; preferably at least about 50%; most preferably at least about 80% of the desired unsaturated or saturated acids. For example, rapeseed oil fatty acid radicals or soybean oil fatty acid radicals can be used instead of pure $C_{12}$-$C_{26}$ unsaturated fatty acids. Hardened (i.e., hydrogenated) high erucic rapeseed oil fatty acids can be used instead of pure $C_{20}$-$C_{26}$ saturated acids. Preferably the $C_{20}$ and higher acids (or their derivatives—e.g. methyl esters) are concentrated; for example by distillation. The fatty acids from palm kernel oil, babassu kernel oil, and coconut oil can be used as a source of $C_8$-$C_{12}$ fatty acids.

Examples of other source oils for making solid polyol polyesters of the present invention include high oleic sunflower oil and substantially completely hydrogenated high erucic rapeseed oil. When sucrose is substantially completely esterified with a 1:3 by weight blend of the methyl esters of the fatty acids of these two oils, the resulting sucrose polyester will have a molar ratio of unsaturated $C_{18}$ acid radicals to $C_{20}$ and higher saturated acid radicals of about 1:1 and 28.6 weight percent of the total fatty acids in the polyester will be $C_{20}$ and $C_{22}$ fatty acids.

The higher the proportions of the desired unsaturated and saturated fatty acids in the fatty acid stocks used in making the solid polyol polyester, the more efficient the polyol polyester will be in its ability to bind liquid oils.

Examples of solid polyol polyesters of the present invention are sorbitol hexaester in which the acid ester radicals are palmitoleate and arachidate in a 1:2 molar ratio; the octaester of raffinose in which the acid ester radicals are linoleate and behenate in a 1:3 molar ratio; the heptaester of maltose wherein the esterifying fatty acid radicals are sunflower seed oil fatty acids and lignocerate in a 3:4 molar ratio; the octaester of sucrose wherein the esterifying acid radicals are oleate and behenate in a 2:6 molar ratio; and the octaester of sucrose wherein the esterifying acid radicals are laurate, linoleate and behenate in a 1:3:4 molar ratio. A preferred material is sucrose polyester in which from 7 to 8 of the hydroxy groups have been esterified, and in which the fatty acid radicals are $C_{18}$ mono- and di-unsaturated and behenic, in a molar ratio of 1:7.

The solid polyol polyesters used in the present invention can be made according to prior known methods for preparing polyesters of polyols. Since the sucrose polyesters are the preferred solid polyol polyesters herein, the invention will be exemplified primarily by these materials. One such method of preparation is by reacting the acid chlorides of the fatty acids with sucrose. In this method a mixture of the acid chloride or acid anhydride of the fatty acids can be reacted in one step with sucrose, or the acid chlorides can be reacted sequentially with sucrose. Another preparation method is by the process of reacting methyl esters of the fatty acids with sucrose in the presence of a fatty acid soap and a basic catalyst such as potassium carbonate. See, for example, U.S. Pat. Nos. 3,963,699, Rizzi et al., issued June 15, 1976; 4,518,772, Volpenhein, issued May 21, 1985; and 4,517,360, Volpenhein, issued May 14, 1985, and U.S. Ser. No. 417,990, Letton, filed Oct. 6, 1989, all incorporated herein by reference.

When using the methyl ester route for preparing the solid polyol polyesters herein, the fatty acid methyl esters are blended in the desired ratio and reacted with sucrose by transesterification to obtain the sucrose esters of mixed unsaturated/saturated or saturated fatty acids. In a preferred way of practicing the methyl ester process, five moles of the blended saturated/unsaturated or saturated methyl esters are reacted with sucrose in a first stage at 135° C. to obtain partial esters of sucrose. An additional nine moles of the blended esters are then added and the reaction continued at 135° C. under reduced pressure until the desired degree of esterification has been attained.

B. TRIGLYCERIDES

In addition to the nondigestible polyol polyester, the fat blends of the present invention may include a digestible triglyceride fat or oil. Generally, fat blends of the present invention have from 0% to about 50% of such triglyceride fat or oils; preferably from about 0% to about 35%; most preferably from about 0% to about 10%.

As used herein, "triglycerides oils" refers to those triglycerides which are fluid or liquid at 25° C. Although not a requirement, the triglyceride oils useful in the present invention can include those which are fluid or liquid below 25° C. These triglyceride oils consist primarily of triglyceride materials, but also can include residual levels of other components such as mono- and diglycerides. To remain fluid or liquid at temperatures below 25° C., the triglyceride oils contain a minimal amount of glycerides having melting point higher than about 25° C. so as to limit the level of solids when the triglyceride oil is cooled. It is desirable that the triglyceride oil be chemically stable and resistant to oxidation.

As used herein, the term "triglyceride fat" refers to those triglyceride compositions which are solid or plastic above 25° C. These solid or plastic fats can be derived from plants or animals or can be edible synthetic fats or oils. For example, animal fats such as lard, tallow, oleo oil, oleo stock, oleo stearin, and the like which are solid at room temperature, can be utilized. Also, triglyceride oils, e.g. unsaturated vegetables oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al., issued Nov. 28, 1967, and U.S. Pat. No. 3,867,556 to Darragh et al., issued Feb. 18, 1975 (herein incorporated by reference), for further examples of solid or plastic fats.

Suitable sources of such triglycerides are: 1) vegetable fats and oils such as soybean, corn, sunflower, olive, safflower, sesame seed, nasturtium seed, high erucic acid rapeseed, low erucic acid rapeseed, canola, cottonseed, tiger seed, ricebran, wallflower, and mustard seed; 2) meat fats such as tallow or lard; 3) marine oils such as menhaden, pilchard, sardine, whale or herring; 4) nut fats such as coconut, palm, palm kernel, babassu kernel, or peanut; 5) milkfat, butterfat; 6) cocoa butter and cocoa butter substitutes such as shea, or illipe butter; and 7) synthetic fats.

Fats and oils having a high proportion of the shorter chain-length fatty acids, i.e. principally less than about 14 carbon atoms, such as coconut, babassu kernel, and palm kernel oils may be used herein. These shorter chain fatty acids provide the highest water vapor transport rate for the frying mediums of the present invention. The preferred fats or oils for use herein are edible vegetable oils, and mixtures thereof, comprising triglycerides having saturated and/or unsaturated fatty acid groups predominately in the range of from about 12 to about 24 carbon atoms such as lauroyl, lauroleoyl, myristoyl, myristoleoyl, arachidoyl, archidonoyl, behenoyl, erucoyl, and the like. Branched chain saturated or unsaturated fatty acid groups are also useful herein.

Forms and Uses of the Invention

The fat blends of the present invention may be used to fry both high and low moisture foods. These foods have nonfat ingredients such as carbohydrates and proteins. Low moisture foods, such as potato chips, typically have a final moisture content of about 10% or less, while high moisture foods have a final moisture content of greater than about 10%. High moisture foods include, but are not limited to, french fried potatoes, hash brown potatoes, hush puppies, deep fried pies and turnovers, and batter dipped or breaded chicken and seafood. Low moisture foods include but are not limited to cereal and/or starch based snack foods such as conventional and fabricated potato chips, corn chips, tortilla chips, and shoestring potatoes.

Particular forms and uses for the present fat blends are as follows:

1) Deep Fat Frying Oil. In deep fat frying the food is completely surrounded by the frying fat. The fat acts as a heat transfer medium. The fat reacts with the protein and carbohydrate components of the food, generating flavors and aromas which have appeal to the consumer; See Weiss, *Foods Oils and Their Uses*, 108–110 (1970). In the case of french fried potatoes, the uncooked fries are immersed in the fat blend of the present invention heated to a temperature of from about 340° F. to about 375° F. for about 2.5 to about 5 minutes, or until desirable sensory attributes are obtained. In the deep frying process the moisture in the food is boiled off throughout the process. Although a frying oil would only have to be above the boiling temperature of water to cook the food, low temperatures of about 212° F. would result in unreasonable cooking times, and negative sensory attributes such as greasy and limp food. The fat blends of the present invention have overcome such negatives because, at typical frying temperatures, they successfully transfer moisture at a rate that allows the food to have proper texture, crispness, mouthfeel, color, and flavor.

2) Cooking Oil. The fat blends of the present invention can also be used as a cooking oil. Use as a cooking oil is somewhat different than that of a deep frying fat. Cooking oils are typically used in grill and pan frying to aid in developing flavor and food coloring distinct from that of foods deep fried. They are also used to prevent food from sticking to the pan; see Weiss, *Food Oils and Their Uses*, 115–116 (1970).

3) Solid or Plastic Shortening. The fat blends of the present invention may also be used as a component in solid or plastic shortenings. Solid shortenings are used in frying and baking, preferably in pan frying wherein the solid shortening is first melted in the pan before cooking the food as disclosed in the cooking oil section above.

4) Pourable Shortening. The present fat blends may be used as a component in pourable or liquid shortening. Such pourable shortenings are preferably used as cooking oils as described above. See Weiss, *Food Oils and Their Uses*, 128–129 (1970).

Analytical Methods

1. Fatty Acid Composition of Polyol Polyesters

Fatty acid composition (FAC) of the polyester is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure Ce 1-62.

2. Ester Distribution of Sucrose Polyesters

The relative distribution of the individual octa-, hepta-, hexa- and penta- esters, as well as collectively the mono- through tetra- esters, of the polyester can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e., an evaporative light scattering detector). The detector response is measured and then normalized to 100%. The individual ester groups are expressed as a relative percentage.

3. Complete Melting Point

Equipment

Perkin-Elmer 7 Series Thermal Analysis System, Model DSC7, manufactured by Perkin-Elmer, Norwalk, Conn.

Procedure

1) Sample is heated to at least 10° C. above the complete melting point and mixed thoroughly.
2) 10±2 mg. of sample is weighed into sample pan.

3) A scan is performed from about 10° C. above the complete melting point to −60° C. at 5° C. per minute.
4) The temperature of the sample is maintained at −60° C. for 3 minutes and rescanned from −60° C. to the original starting temperature at 5° C. per minute (i.e. about 10° C. above the complete melting point).
5) The complete melting point is the temperature at the intersection of the baseline (specific heat line) with the line tangent to the trailing edge of the endothermic peak.

EXAMPLE 1

Preparation of a Deep Fat Frying Oil

The deep fat frying oil of the present example comprises about 96% liquid sucrose fatty acid polyester, and 4% solid polyol fatty acid polyester (percentages by weight of the composition).

The liquid sucrose fatty acid polyester used in the present example is esterified with octanoic acid ($C_{8:0}$) and is prepared using the methods described in U.S. Pat. Nos. 4,517,360, and 4,518,772; herein incorporated by reference.

The solid sucrose fatty acid polyester is prepared by a modification of the process described in U.S. Pat. Nos. 4,517,360, and 4,518,772 supra. High erucic acid rapeseed oil (HEAR) is blended with low erucic acid rapeseed oil (LEAR) to a composition of 38% erucic acid. The rapeseed oil blend is mixed with 3%–6% refined, bleached cottonseed oil to obtain an oil composition having approximately 35% of $C_{22}$ acid (i.e., behenic plus erucic). This rapeseed/cottonseed stock is then hydrogenated to an iodine value less than 4. Hydrogenation is done with nickel catalyst levels typical of any vegetable oil using 0–100 psig pressure, and a temperature of approximately 375° F.

The material is deodorized at a temperature of 375°–495° F. The hardened, deodorized rapeseed/cottonseed oil has the following characteristics: fatty acid composition: 3–7% $C_{16:0}$, 45–55% $C_{18:0}$, 0–2% $C_{18:1}$, 0–1% $C_{18:2}$, 4–8% $C_{20:0}$, 33–37% $C_{22:0}$, 0–1% $C_{22:1}$, 0–2% $C_{24:0}$. Free fatty acid content is 0.01–0.1% and Lovibond red color is about 1.0.

The rapeseed/cottonseed oil is converted into methyl esters through an esterification process in which the oil is mixed with methanol, a sodium methoxide catalyst is added, and the reaction is continued until all the triglycerides are converted into methyl esters. Glycerine is settled by gravity after the reaction is completed. The esters are then water washed with hot water to remove trace levels of glycerine and soap. The water phase is settled out by gravity after each wash.

The esters are flash distilled in a batch mode to both remove unsaponifiable materials and to obtain a more concentrated $C_{22}$ material. The distillation is done under a vacuum of 0.5–2mm Hg and a temperature of 300°–410° F. The last 10%–15% of the esters distilled are collected into a clean vessel for use in making the desired sucrose polyester. The other 85–90% is discarded. The ester composition of the last 10–15% collected is: 4% $C_{18:0}$, 6% $C_{20:0}$, 87% $C_{22:0}$, 3% $C_{24:0}$. These are esters "A".

Refined and bleached sunflower oil is deodorized at a temperature of 375°–495° F. under vacuum. The deodorized sunflower oil has the following characteristics: iodine value: 125–140; fatty acid composition: 5–10% $C_{16:0}$, 2–6% $C_{18:0}$, 19–26% $C_{18:1}$, 63–74% $C_{18:2}$, 0–2% $C_{18:3}$, 0–1% $C_{20:0}$, 0–1% $C_{22:0}$. Free fatty acid content is 0.01–0.1% and Lovibond red color is about 1.3.

The sunflower oil is converted into methyl esters through the same esterification process as described above. The esters are flash distilled in a batch mode, primarily to remove unsaponifiable materials. The distillation is done under a vacuum of 0.5–2.0 mm Hg and a temperature of 300°–410° F. These are esters "B".

About 70.5 Kg of methyl esters of a refined soybean oil, hardened to an iodine value of about 2, are mixed with 209 Kg of methanol and 15.4 Kg of potassium hydroxide in a stainless steel batch reactor. The mixture is heated to about 145° F. (63° C.) with agitation for 1 to 3 hours at atmospheric pressure. During this time, all but a residual amount of the methyl esters are saponified to make soap.

About 1193.6 Kg of ester "A" is blended with 241.4 Kg of ester "B" to make ester blend "C". The ester composition of blend "C" is: 1.2% $C_{16:0}$, 3.8% $C_{18:0}$, 3.8% $C_{18:1}$, 10.7% $C_{18:2}$, 4.7% $C_{20:0}$, 71.9% $C_{22:0}$, 3% $C_{24:0}$. About 545.5 Kg. of ester "C" are added to the previously made soap mixture.

About 104.5 Kg of granular sucrose are then added to give a 5:1 molar ratio of methyl ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C). This is to remove the methanol. A vacuum is then pulled and the mixture agitated for up to 8 hours to form the mono-, di- and trisucrose esters. Small quantities of tetra- and pentaesters are also formed during this stage. Additional methyl ester "C" (890 Kg) which has been preheated to 275° F. (135° C.) is added to bring and maintain the molar ratio of the esters to sucrose to 14–15:1. Additional potassium carbonate is then added twice to the mixture (each addition being approximately 0.5 wt. percent of the initial reaction mix). When the reaction conditions stabilize at 275° F. (135° C.), a nitrogen sparge is used to improve agitation and promote methanol stripping. This second reaction stage lasts approximately 4 to 13 hours.

The reaction mixture is then cooled under nitrogen to between 149° F. (65° C.) and 185° F. (85° C.). The crude reaction mixture is agitated with about 91 Kg water. The hydrated crude reaction mixture is passed through a centrifuge to separate a heavy and a light phase. The heavy phase which contains the soaps, excess sugars and potassium carbonate is discarded. The light phase was then washed with an additional 264 Kg of water.

The light phase, which contains methyl esters and the sucrose polyester is then dried to remove moisture at 170° F.–190° F. (76°–88° C.) under 70 mm Hg or less vacuum for 30 to 60 minutes. Filtrol 105 (1.0 wt. percent) is added and the mix is agitated at 167° F. (75° C.) to 190° F. (88° C.). The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 0.5 mm Hg of vacuum.

The sucrose polyester is then deodorized by passing downward through a stainless steel packed column deodorizer or other suitable device at 392° F. (200° C.) to 450° F. (232° C.) under a vacuum of about <25 mm Hg or less. Steam is introduced to the bottom of the column and passes counter-currently to the sucrose polyester. Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. The sucrose polyester is stored in clean stainless steel drums.

The liquid and solid sucrose polyesters made according to the procedures described above have the following approximate compositions:

TABLE 1

|  | Liquid Sucrose Polyester (%) | Solid Sucrose Polyester (%) |
|---|---|---|
| Fatty Acid Composition |  |  |
| C8 | 96.3 | 0.2 |
| C10 | 0.9 | — |
| C12 | — | — |
| C14 | — | — |
| C16 | 1.3 | 1.0 |
| C18 | 1.5 | 4.3 |
| C18:1 | — | 3.1 |
| C18:2 | — | 9.1 |
| C18:3 | — | 0.2 |
| C20 | — | 4.5 |
| C22 | — | 73.0 |
| C24 | — | 2.8 |
| Other | — | 1.8 |
| Iodine Value | 0.0 | 19.8 |
| Ester Distribution |  |  |
| Octa | 99.9 | 71.6 |
| Hepta | 0.1 | 28.2 |
| Hexa | <0.1 | 0.2 |
| Penta | <0.1 | <0.1 |
| Lower | <0.1 | <0.1 |

A deep fat frying oil is prepared by blending the liquid sucrose polyester with the solid sucrose polyester. Agitate, while heating the mixture to approximately 176° F. (80° C.), until all solids melt, and cool to room temperature.

EXAMPLE 2

Preparation of a Deep Fat Frying Oil

The deep fat frying oil of the present example comprises about 97% liquid sucrose fatty acid polyester, and 3% solid polyol fatty acid polyester (percentages by weight of the composition).

The liquid sucrose fatty acid polyester used in the present example is prepared by the methyl ester synthesis process utilizing a coconut oil source as disclosed in U.S. Pat. Nos. 4,517,360, and 4,518,772; both incorporated by reference supra.

The solid sucrose fatty acid polyester is the solid according to Example 1.

The liquid and solid sucrose polyesters have the following approximate compositions:

TABLE 2

|  | Liquid Sucrose Polyester (%) | Solid Sucrose Polyester (%) |
|---|---|---|
| Fatty Acid Composition |  |  |
| C8 | 3.8 | 0.2 |
| C10 | 7.0 | — |
| C12 | 57.2 | — |
| C14 | 21.6 | — |
| C16 | 6.6 | 1.0 |

TABLE 2-continued

|  | Liquid Sucrose Polyester (%) | Solid Sucrose Polyester (%) |
|---|---|---|
| C18 | 1.5 | 4.3 |
| C18:1 | 1.9 | 3.1 |
| C18:2 | 0.4 | 9.1 |
| C18:3 | — | 0.2 |
| C20 | — | 4.5 |
| C22 | — | 73.0 |
| C24 | — | 2.8 |
| Other | — | 1.8 |
| Iodine Value | 2.3 | 19.8 |
| Ester Distribution |  |  |
| Octa | 79.1 | 71.6 |
| Hepta | 20.6 | 28.2 |
| Hexa | 0.1 | 0.2 |
| Penta | 0.2 | <0.1 |
| Lower | <0.1 | <0.1 |

A deep fat frying oil is prepared by blending the liquid sucrose polyester with the solid sucrose polyester. Agitate, while heating the mixture to approximately 176° F. (80° C.), until all solids melt, and cool to room temperature.

EXAMPLE 3

Preparation of a Pourable Shortening

The pourable shortening of the present example comprises about 63.75% liquid sucrose polyol fatty acid polyester, about 11.25% solid sucrose fatty acid polyester, and about 25% liquid triglyceride oil.

The liquid sucrose fatty acid polyester used in the present example is that according to Example 2.

The solid sucrose fatty acid polyester is prepared by the methyl ester synthesis route from hydrogenated soybean oil. Preparation of these solids are made by the methods disclosed in U.S. Pat. Nos. 3,963,699, 4,517,360, and 4,518,772, incorporated by reference supra.

The triglyceride oil is an unhardened soybean oil.

The liquid and solid sucrose polyesters have the following approximate compositions:

TABLE 3

|  | Liquid Sucrose Polyester (%) | Solid Sucrose Polyester (%) |
|---|---|---|
| Fatty Acid Composition |  |  |
| C8 | 3.8 | — |
| C10 | 7.0 | — |
| C12 | 57.2 | — |
| C14 | 21.6 | 0.2 |
| C16 | 6.6 | 12.6 |
| C18 | 1.5 | 84.8 |
| C18:1 | 1.9 | 1.7 |
| C18:2 | 0.4 | 0.2 |
| C18:3 | — | — |
| C20 | — | 0.3 |
| C22 | — | — |
| C24 | — | — |
| Other | — | 0.2 |
| Iodine Value | 2.3 | 1.9 |
| Ester Distribution |  |  |
| Octa | 79.1 | 92.8 |
| Hepta | 20.6 | 7.2 |
| Hexa | 0.1 | <0.1 |
| Penta | 0.2 | <0.1 |
| Lower | <0.1 | <0.1 |

A pourable shortening is prepared by blending the liquid sucrose polyester, the solid sucrose polyester, and the liquid triglyceride oil. Agitate, while heating the mixture to approximately 176° F. (80° C.), until all solids melt, and cool to room temperature.

EXAMPLE 4

Preparation of a Pourable Shortening

The pourable shortening of the present example comprises about 63.5% liquid sucrose fatty acid polyester, 1.5% solid sucrose fatty acid polyester, and 35% liquid triglyceride oil.

The liquid and solid sucrose fatty acid polyesters used in the present example are those according to Example 1. The triglyceride oil is an unhardened soybean oil.

The liquid and solid sucrose polyesters have the following approximate compositions:

TABLE 4

|  | Liquid Sucrose Polyester (%) | Solid Sucrose Polyester (%) |
|---|---|---|
| Fatty Acid Composition |  |  |
| C8 | 96.3 | 0.2 |
| C10 | 0.9 | — |
| C12 | — | — |
| C14 | — | — |
| C16 | 1.3 | 1.0 |
| C18 | 1.5 | 4.3 |
| C18:1 | — | 3.1 |
| C18:2 | — | 9.1 |
| C18:3 | — | 0.2 |
| C20 | — | 4.5 |
| C22 | — | 73.0 |
| C24 | — | 2.8 |
| Other | — | 1.8 |
| Iodine Value | 0.0 | 19.8 |
| Ester Distribution |  |  |
| Octa | 99.9 | 71.6 |
| Hepta | 0.1 | 28.2 |
| Hexa | <0.1 | 0.2 |
| Penta | <0.1 | <0.1 |
| Lower | <0.1 | <0.1 |

A pourable shortening is prepared by blending the liquid sucrose polyester, the solid sucrose polyester, and the liquid triglyceride oil. Agitate, while heating the mixture to approximately 176° F. (80° C.), until all solids melt, and cool to room temperature.

EXAMPLE 5

Preparation of a Cooking Oil

The cooking oil of the present invention comprises about 49.5% liquid sucrose fatty acid polyester, about 0.5% of a solid sucrose fatty acid polyester, and about 50.0% of a liquid triglyceride oil.

The liquid triglyceride is an unhardened canola oil. The liquid sucrose fatty acid polyester is that according to Example 1. The solid sucrose fatty acid polyester is made by reacting the acid chlorides or acid anhydrides of purified oleic and behenic acids. The procedure is as follows:

Dissolve 30 g of sucrose in a solution of 150 ml pyridine and 100 ml dimethylformamide by heating to about 55° C. while under a nitrogen atmosphere. Cool the solution to about 40° C. and add, drop by drop, a solution of 61 g of oleyl chloride in 100 mls of heptane while maintaining a temperature of between 40°–44° C. and a nitrogen atmosphere. Stir the solution for about 3½ hours, maintaining a temperature of about 25° C.

Add drop by drop to the mixture above, a solution comprising 207.2 g of behenyl chloride in 200 mls of heptane. Let this mixture sit at 25° C. for about 12 to about 16 hours. Heat the mixture to about 90° C. and stir for about 8 hours. Add to the mixture about 600 mls of heptane, wash with diluted HCl and then wash with hot water. Repeat the acid and water washings a total of three times.

Dry the heptane solution over $MgSO_4$ and filter through a buchner funnel. Strip the heptane solution under vacuum. Extract the residue three times with boiling methanol. Remove the methanol insoluble residue and dissolve it in about 200 mls of hot ethyl acetate. Add this solution to about 1200 mls of methanol to crystallize the solid sucrose fatty acid polyester. Stir this crystalline dispersion at room temperature for about 1 hour, and filter out the solids using a buchner funnel. Wash the solid with methanol, and allow it to air dry.

The liquid and solid sucrose polyesters of the present example have the following approximate compositions:

TABLE 5

|  | Liquid Sucrose Polyester (%) | Solid Sucrose Polyester (%) |
|---|---|---|
| Fatty Acid Composition |  |  |
| C8 | 96.3 | 0.2 |
| C10 | 0.9 | 0.1 |
| C12 | — | — |
| C14 | — | — |
| C16 | 1.3 | 0.8 |
| C18 | 1.5 | 1.3 |
| C18:1 | — | 16.5 |
| C18:2 | — | — |
| C18:3 | — | 0.2 |
| C20 | — | 3.9 |
| C22 | — | 75.1 |
| C24 | — | 0.6 |
| Other | — | 1.3 |
| Iodine Value | 0.0 | 15.5 |
| Ester Distribution |  |  |
| Octa | 99.9 | 92.4 |
| Hepta | 0.1 | 7.6 |
| Hexa | <0.1 | <0.1 |
| Penta | <0.1 | <0.1 |
| Lower | <0.1 | <0.1 |

The cooking oil is prepared by blending the liquid sucrose fatty acid polyester, the solid sucrose fatty acid polyester, and the triglyceride oil. Heat the mixture to approximately 176° F. (80° C.), agitate, and cool in a scraped wall heat exchanger using −10° F. (−23° C.) brine solution with a heat exchanger outlet temperature of about 17° F. (−8° D.). Deaerate the composition to insure no air bubbles are trapped within it.

EXAMPLE 6

Preparation of a Plastic Shortening for use in Food Service Cooking/Frying Applications The plastic shortening of the present example comprises about 60% of a liquid sucrose fatty acid polyester, about 5.0% of a solid sucrose fatty acid polyester, about 25.0% of an intermediate melting fraction triglyceride, and about 10.0% of a liquid triglyceride oil.

The liquid and solid sucrose fatty acid polyesters are those according to Example 1.

The intermediate melting fraction triglyceride is a soybean oil hydrogenated to an iodine value of 43.

The liquid triglyceride oil is unhardened canola oil.

The liquid and solid sucrose polyesters have the following approximate compositions:

TABLE 6

| | Liquid Sucrose Polyester (%) | Solid Sucrose Polyester (%) |
|---|---|---|
| Fatty Acid Composition | | |
| C8 | 96.3 | 0.2 |
| C10 | 0.9 | — |
| C12 | — | — |
| C14 | — | — |
| C16 | 1.3 | 1.0 |
| C18 | 1.5 | 4.3 |
| C18:1 | — | 3.1 |
| C18:2 | — | 9.1 |
| C18:3 | — | 0.2 |
| C20 | — | 4.5 |
| C22 | — | 73.0 |
| C24 | — | 2.8 |
| Other | — | 1.8 |
| Iodine Value | 0.0 | 19.8 |
| Ester Distribution | | |
| Octa | 99.9 | 71.6 |
| Hepta | 0.1 | 28.2 |
| Hexa | <0.1 | 0.2 |
| Penta | <0.1 | <0.1 |
| Lower | <0.1 | <0.1 |

Blend the above ingredients, heat to approximately 176° F. (80° C.), agitate, and plasticize the composition by a freeze/pick process. Disperse nitrogen gas in the shortening during the freezing process (for appearance purposes).

EXAMPLE 7

Preparation of Fried Potato Chips

Slice Norchip potatoes to a thickness of about 0.052 inches. Fry the slices (approximately 225) in a 5 pound oil capacity batch fryer at a controlled temperature of 365° F. (185° C.) for 3 minutes using any of the compositions in the above Examples. After frying, drain the chips, and salt them.

EXAMPLE 8

Preparation of French Fry Potatoes

Fry regular-cut ($\gtrsim$"×3") french fry potatoes in a 5 pound fryer with a french fry to oil load ratio of 1:9. Heat oil, selected from those in the above Examples, to a temperature of 365° F. (185° C.) and cook the potatoes for approximately 5 minutes. Remove the cooked french fries, allow to drain, and salt.

What is claimed is:

1. A reduced calorie cooking and frying fat composition having improved cooking characteristics, said fat composition comprising:
   (A) from about 50% to about 100% of the composition of a polyol fatty acid polyester fraction comprising:
   1) from about 70% to about 99% of the fraction of a liquid polyol fatty acid ester component, wherein the polyols used to synthesize the polyesters of the liquid polyester component contain at least 4 hydroxyl groups, at least 4 of which are esterified; wherein the fatty acid ester groups forming the polyesters of the liquid polyester component contain from about 2 to about 24 carbon atoms; and wherein at least about 90% of said fatty acid ester groups are formed from saturated fatty acid radicals containing not more than 14 carbon atoms; and
   2) from about 1% to about 30% of the fraction of a solid polyol fatty acid polyester component having a complete melting point above about 37° C., wherein the polyols used to synthesize the polyester of the solid polyester component contain at least 4 hydroxyl groups at least 4 of which are esterified; and
   (B) from 0% to about 50% of the composition of a triglyceride fraction.

2. A composition according to claim 1 comprising from about 90% to about 100% of the polyol fatty acid polyester fraction and from 0% to about 10% of the triglyceride fraction.

3. A composition according to claim 1 wherein the liquid polyol fatty acid polyester component comprises from about 80% to about 99% of the polyol fatty acid polyester fraction and the solid polyol fatty acid polyester component comprises from about 1% to about 20% of the polyol fatty acid polyester fraction.

4. A composition according to claim 3 wherein the liquid polyol fatty acid polyester component comprises from about 94% to about 99% of the polyol fatty acid polyester fraction and the solid polyol fatty acid polyester component comprises from about 1% to about 6% of the polyol fatty acid polyester fraction.

5. A composition according to claim 1 wherein the fatty acid radicals forming the polyesters of the solid polyester component consist essentially of $C_{16}$ or higher saturated fatty acids.

6. A composition according to claim 1 wherein the fatty acid radicals forming the polyesters of the solid polyester component comprise a combination of:
   (a) $C_{12}$–$C_{22}$ unsaturated fatty acid radicals, $C_6$–$C_{12}$ saturated fatty acid radicals or mixtures thereof; and
   (b) at least about 30% $C_{20}$–$C_{26}$ saturated fatty acid radicals; wherein the molar ratio of (a):(b) radicals ranges from about 1:7 to about 5:3.

7. A composition according to claim 6 wherein the fatty acid radicals forming the polyesters of the solid polyester component comprise a combination of:
   (a) $C_{18}$ mono- and diunsaturated fatty acid radicals, $C_8$–$C_{12}$ saturated fatty acid radicals or mixtures thereof; and
   (b) at least about 50% $C_{22}$ saturated fatty acid radicals; wherein the molar ratio of (a):(b) radicals ranges from about 1:7 to about 3:5.

8. A composition according to claim 7 wherein the polyol fatty acid polyester fraction comprises sugar fatty acid polyesters, sugar alcohol fatty acid polyesters, or mixtures thereof.

9. A composition according to claim 8 wherein the polyol fatty acid polyester fraction comprises sucrose fatty acid polyesters.

10. A composition according to claim 9 wherein the liquid polyol fatty acid polyester component comprises polyesters formed from fatty acids derived from a source oil selected from palm kernel oil, babassu kernel oil, coconut oil, and mixtures thereof.

11. A composition according to claim 1 wherein at least about 50% of the fatty acid radicals forming the polyesters of the liquid polyol fatty acid polyester component contain not more than 12 carbon atoms.

12. A composition according to claim 11 wherein at least about 70% of the fatty acid radicals forming the polyesters of the liquid polyol fatty acid polyester component contain not more than 12 carbon atoms.

13. A composition according to claim 12 wherein at least about 90% of the fatty acid radicals forming the polyesters of the liquid polyol fatty acid polyester component are selected from caproic, caprylic, capric, lauric, and mixtures thereof.

14. A composition according to claim 13 wherein the polyol fatty acid polyester fraction comprises sugar fatty acid polyesters, sugar alcohol fatty acid polyesters, or mixtures thereof.

15. A composition according to claim 14 wherein the polyol fatty acid polyester fraction comprises sucrose fatty acid polyesters.

16. A composition according to claim 1 wherein at least about 50% of the fatty acid radicals forming the polyesters of the liquid polyol fatty acid polyester component contain not more than 8 carbon atoms.

17. A composition according to claim 16 wherein at least about 70% of the fatty acid radicals forming the polyesters of the liquid polyol fatty acid polyester component contain not more than 8 carbon atoms.

18. A composition according to claim 17 wherein at least about 90% of the fatty acid radicals forming the polyesters of the liquid polyol fatty acid polyester component are selected from caproic, caprylic, and mixtures thereof.

19. A composition according to claim 18 wherein the polyol fatty acid polyester fraction comprises sugar fatty acid polyesters, sugar alcohol fatty acid polyesters, or mixtures thereof.

20. A composition according to claim 19 wherein the polyol fatty acid polyester fraction comprises sucrose fatty acid polyesters.

21. A method for preparing foods which comprises the step of cooking or frying the food in a reduced calorie fat composition having improved cooking characteristics, said fat composition comprising:
(A) from about 50% to about 100% of the composition of a polyol fatty acid polyester fraction comprising:
1) from about 70% to about 99% of the fraction of a liquid polyol fatty acid ester component, wherein the polyols used to synthesize the polyesters of the liquid polyester component contain at least 4 hydroxyl groups, at least 4 of which are esterified; wherein the fatty acid ester groups forming the polyesters of the liquid polyester component contain from about 2 to about 24 carbon atoms; and wherein at least about 90% of said fatty acid ester groups are formed from saturated fatty acid radicals containing not more than 14 carbon atoms; and
2) from about 1% to about 30% of the fraction of a solid polyol fatty acid polyester component having a complete melting point above about 37° C., wherein the polyols used to synthesize the polyester of the solid polyester component contain at least 4 hydroxyl groups at least 4 of which are esterified; and
(B) from 0% to about 50% of the composition of a triglyceride fraction.

22. A method according to claim 21 wherein the fat composition comprises from about 70% to about 100% of the polyol fatty acid polyester fraction, and from 0% to about 30% of the triglyceride fraction.

23. A method according to claim 21 wherein the liquid polyol fatty acid polyester component comprises from about 80% to about 99% of the polyol fatty acid polyester fraction and the solid polyol fatty acid polyester component comprises from about 1% to about 20% of the polyol fatty acid polyester fraction.

24. A method according to claim 23 wherein the liquid polyol fatty acid polyester component comprises from about 94% to about 99% of the polyol fatty acid polyester fraction and the solid polyol fatty acid polyester component comprises from about 1% to about 6% of the polyol fatty acid polyester fraction.

25. A method according to claim 21 wherein the fatty acid radicals forming the polyesters of the solid polyester component consist essentially of $C_{16}$ or higher saturated fatty acids.

26. A method according to claim 21 wherein the fatty acid radicals forming the polyesters of the solid polyester component comprise a combination of:
(a) $C_{12}$–$C_{22}$ unsaturated fatty acid radicals, $C_6$–$C_{12}$ saturated fatty acid radicals or mixtures thereof; and
(b) at least about 30% $C_{20}$–$C_{26}$ saturated fatty acid radicals; wherein the molar ratio of (a):(b) radicals ranges from about 1:7 to about 5:3.

27. A method according to claim 26 wherein the fatty acid radicals forming the polyesters of the solid polyester component comprise a combination of:
(a) $C_{18}$ mono- and diunsaturated fatty acid radicals, $C_8$–$C_{12}$ saturated fatty acid radicals or mixtures thereof; and
(b) at least about 50% $C_{22}$ saturated fatty acid radicals; wherein the molar ratio of (a):(b) radicals ranges from about 1:7 to about 3:5.

28. A method according to claim 27 wherein the polyol fatty acid polyester fraction comprises sugar fatty acid polyesters, sugar alcohol fatty acid polyesters, or mixtures thereof.

29. A method according to claim 28 wherein the polyol fatty acid polyester fraction comprises sucrose fatty acid polyesters.

30. A method according to claim 21 wherein at least about 50% of the fatty acid radicals forming the polyesters of the liquid polyol fatty acid polyester component contain not more than 12 carbon atoms.

31. A method according to claim 30 wherein at least about 70% of the fatty acid radicals forming the polyesters of the liquid polyol fatty acid polyester component contain not more than 12 carbon atoms.

32. A method according to claim 31 wherein at least about 90% of the fatty acid radicals forming the polyesters of the liquid polyol fatty acid polyester component are selected from caproic, caprylic, capric, lauric, and mixtures thereof.

33. A method according to claim 32 wherein the polyol fatty acid polyester fraction comprises sugar fatty acid polyesters, sugar alcohol fatty acid polyesters, or mixtures thereof.

34. A method according to claim 33 wherein the polyol fatty acid polyester fraction comprises sucrose fatty acid polyesters.

35. A method according to claim 21 wherein at least about 50% of the fatty acid radicals forming the polyesters of the liquid polyol fatty acid polyester component contain not more than 8 carbon atoms.

36. A method according to claim 35 wherein at least about 70% of the fatty acid radicals forming the polyesters of the liquid polyol fatty acid polyester component contain not more than 8 carbon atoms.

37. A method according to claim 36 wherein at least about 90% of the fatty acid radicals forming the polyesters of the liquid polyol fatty acid polyester component are selected from caproic, caprylic, and mixtures thereof.

38. A method according to claim 37 wherein the polyol fatty acid polyester fraction comprises sugar fatty acid polyesters, sugar alcohol fatty acid polyesters, or mixtures thereof.

39. A method according to claim 38 wherein the polyol fatty acid polyester fraction comprises sucrose fatty acid polyesters.

40. A method according to claim 21 wherein the food is fried in the fat composition at a temperature from about 300° F. to about 400° F. for about 5 seconds to about 5 minutes.

41. A fried food product prepared according to the method of claim 40.

42. A fried food product according to claim 41 selected from french fried potatoes, hash brown potatoes, hush puppies, deep fried pies and turnovers, batter dipped chicken, breaded chicken, batter dipped seafood, breaded seafood, conventional potato chips, fabricated potato chips, corn chips, tortilla chips, and shoestring potatoes.

43. A fried food product according to claim 42 which comprises french fried potatoes.

* * * * *